(12) United States Patent
Paur et al.

(10) Patent No.: US 6,222,089 B1
(45) Date of Patent: Apr. 24, 2001

(54) PROCESS FOR DESTROYING CHLORINATED AROMATIC COMPOUNDS

(75) Inventors: Hanns Paur, Karlsruhe; Hartmut Mätzing, Eggenstein-Leopoldshafen; Werner Baumann, Karlsruhe; Axel Fengler, Korschenbroich, all of (DE)

(73) Assignee: Forschungszenlrum Karlsruhe GmbH, Karisruhe (DE)

( * ) Notice: Subject to any disclaimer, the term of this patent is extended or adjusted under 35 U.S.C. 154(b) by 0 days.

(21) Appl. No.: 09/200,585

(22) Filed: Nov. 27, 1998

Related U.S. Application Data

(63) Continuation-in-part of application No. PCT/EP97/02538, filed on May 17, 1997.

(30) Foreign Application Priority Data

May 28, 1996 (DE) .............................. 196 21 339

(51) Int. Cl.[7] .............................. A62D 3/00; B01D 53/00; C01B 21/00; C01B 17/00
(52) U.S. Cl. ................. 588/210; 204/157.3; 204/157.46; 204/157.49; 204/158.2
(58) Field of Search ........................ 588/210; 204/157.3, 204/157.46, 157.49, 158.2

(56) References Cited

U.S. PATENT DOCUMENTS

| | | | | |
|---|---|---|---|---|
| 4,435,260 | * | 3/1984 | Koichi et al. | 204/164 |
| 5,260,044 | * | 11/1993 | Hiraoka et al. | 423/240 S |
| 6,042,795 | * | 3/2000 | Chen et al. | 423/210 |

FOREIGN PATENT DOCUMENTS

| | | | |
|---|---|---|---|
| 4001305 | * | 7/1991 | (DE) . |
| 0 416 631 | | 3/1991 | (EP) . |
| WO 88/08325 | | 11/1988 | (WO) . |

* cited by examiner

*Primary Examiner*—Edna Wong
(74) *Attorney, Agent, or Firm*—Klaus J. Bach

(57) ABSTRACT

A process for destroying aromatic compounds in an exhaust gas containing also sulfur dioxide, nitrogen oxides and dust, first the dust is removed at a temperature of between room temperature and 150° C. to a residual quantity of not more than 50 mg/m$^3$, the sulfur dioxide is removed to a residual quantity of not more than 1000 mg/m$^3$, the nitrogen oxides are removed to a residual quantity of not more than 300 mg/m$^3$ and the exhaust gas is then subjected to electron irradiation having an energy of 3 to 10 kWh/1000 m$^3$ exhaust gas.

6 Claims, 2 Drawing Sheets

PROCESS FOR DESTROYING CHLORINATED AROMATIC COMPOUNDS

This is a continuation-in-part application of pending international application PCT/EP97/02538 filed May 17, 1997 and claiming the priority of German application No. 196 21 339.8 filed May 28, 1996.

BACKGROUND OF THE INVENTION

The invention resides in a process for destroying chlorinated aromatic compounds of an exhaust gas which also contains sulfur dioxide, nitrogen oxides and dust.

In a number of high temperature processes such as waste incineration, the melting of ores or scrap metal and during sintering polychlorinated, aromatic hydrocarbons such as dibenzodioxines (PCDD), chlorophenols, and chlorobenzenes are formed and emitted into the atmosphere if no means are provided for retaining them. The polychlorinated aromatic hydrocarbons could be gaseous or could be present as particles.

Gaseous polychlorinated aromatic hydrocarbons can be separated from the exhaust gas at low temperatures by adsorption processes.

However, in such an adsorption process, the relatively small mass flows of the polychlorinated aromatic hydrocarbons to be separated require large amounts of adsorbents which subsequently need to be incinerated or deposited underground. It would be better if the polychlorinated aromatic hydrocarbons could be destroyed in the exhaust gas flow so that no secondary waste would be generated.

From DE 38 41 858 C1, it is known that gaseous dioxines and furans can be oxidatively destroyed at higher temperatures by adding hydrogen peroxide to the exhaust gas.

It is also known that various contaminants in the exhaust gas can be destroyed by electron irradiation. Instead of electron irradiation, a number of other types of radiation such as ultraviolet, microwave and gamma radiation have been proposed.

Because of the generally unknown compound spectrum in technical waste gases such irradiation may well cause unforeseeable chemical reactions. The effect of the irradiation therefore depends to a great extent on the composition of the exhaust gases. It cannot be predicted whether a particular contaminant is destroyed by the irradiation.

Another problem in the use of such a process resides in the fact that, with higher temperatures, gaseous PCDD and PCDF can be newly formed from particle-bound carbon.

The new formation of such gaseous PCDD can even exceed the expected decomposition so that the treatment increases the amount of gaseous contaminants in the exhaust gas.

In addition to gaseous PCDD and PCDF, also PCDD and PCDF-containing aerosols can be formed.

Because of the greatly different vapor pressures of the various PCDD and PCDF, the formation of new contaminants in aerosols can also occur at relatively low temperatures. Particle bound PCDD and PCDF, however, cannot be destroyed by irradiation of the exhaust gases with the types of radiation referred to above.

EP 0 416 631 A1 discloses a method for the removal of contaminants from the exhaust gas of a waste incineration plant. In this method, the exhaust gas is conducted at 150° to 300° C. into a reactor in which a spray cloud of an alkaline material is generated and, at the same time, the exhaust gas is exposed in the reactor preferably to electron radiation. It is said in the patent publication that with this method chlorinated organic compounds can be destroyed together with other contaminants. In this method, the gas leaving the reactor is conducted through a dust collector which removes the reaction products of the alkaline material.

However, no dust separator is arranged ahead of the reactor so that all the particles contained in the exhaust gas enter the reactor. Under these circumstances, it is very likely that PCDD and PCDF are newly formed at the reactor exit so that no effective gas clean-up can be achieved. Furthermore, a large part of the radiation energy is consumed for the conversion of the nitrogen oxides and the sulfuric oxides so that the method becomes ineffective with regard to the organic chlorine compounds.

It is the object of the present invention to avoid these disadvantages. With the method according to the invention, the irradiation should be effective almost only for the destruction of the chlorinated aromatic compounds while renewed formation of these compounds in the form of gas as well as in connection with particles is effectively reduced.

SUMMARY OF THE INVENTION

In a process for destroying aromatic compounds in an exhaust gas containing also sulfur dioxide, nitrogen oxides and dust, first the dust is removed at a temperature of between room temperature and 150° C. to a residual quantity of not more than 50 mg/m$^3$, the sulfur dioxide is removed to a residual quantity of not more than 1000 mg/m$^3$ and the nitrogen oxides are removed to a residual quantity of not more than 300 mg/m$^3$, and the exhaust gas is then subjected to electron irradiation having an energy of 3 to 10 kWh/1000 m$^3$ exhaust gas.

With the method according to the invention, the process conditions are so adjusted that the dioxines and the other chlorinated aromatic compounds are largely destroyed inspite of the adverse conditions mentioned above. The disintegration is achieved by OH radicals which are formed in the irradiated exhaust gas from the water content present practically in any exhaust gas.

In accordance with the invention, the exhaust gas is pre-cleaned before the chlorine-containing compounds are destroyed.

The pre-cleaning resides in the removal of dust from the exhaust gas at a temperature of between room temperature and 150° C. down to a particle content of not more than 30 to 50 mg/m$^3$ wherein also particulate chlorinated organic compounds are removed. In addition, sulfuric dioxide has to be removed, either by washing or by sorption to not more than 1000 mg/m$^3$ and preferably to only 500 mg/m$^3$. The nitrogen content should not exceed 300 mg/m$^3$ and preferably should not exceed 100 mg/m$^3$. The nitrogen oxide removal can be achieved by known measures.

Tests in a waste incineration plant have shown that tetra-chlorine dibenzodioxene in water vapor containing air is destroyed by the method according to the invention. Basically, the water vapor content in the exhaust gases of incineration plants is sufficient for performing the method according to the invention. However, a method in which one of the components that is dust, sulfuric oxide and nitrogen oxide is washed out by water is particularly advantageous since in this process a sufficient high degree of humidity is generated in the combustion gas.

For the irradiation of the gas, preferably electron radiation is employed. Other types of radiation are either less effective (UV, microwave) or less suitable in practical applications (gamma radiation).

If the dose is in the area of 15 kGy(10 kW) per 1000 m³ exhaust gas, the limits of the 17. BlmSchV of 0.1 ng TE/m³ can be maintained.

The disintegration products were examined in some cases particularly carefully. A mixture of gaseous trichlorophenol and tetrachlorodibenzadioxin generated simple aliphatic carbon acid which, because of their low concentrations, can be released into the atmosphere without problem. The content of chlorine-containing aromatic compounds in the exhaust gases on the other hand is generally so small that also the simple chlorine compounds or elemental chlorine which are generated do not need to be removed separately. A subsequent filtering stage is therefore not needed.

The advantages of the method according to the invention are therefore summarized as follows:

- the chlorine-containing aromatic compounds are destroyed without the generation of secondary waste;
- no additional chemicals are required;
- the process generates no pressure losses; and
- the energy consumption and investment costs are comparatively low.

Below an embodiment of the invention will be described on the basis of the accompanying drawings.

DESCRIPTION OF SPECIFIC EXAMPLE OF THE INVENTION

The following table shows the composition of the exhaust gas which is subjected to electron beam irradiation. The exhaust gas is the combustion gas of a waste incineration plant. However, the process according to the invention can be used advantageously also with other plants that produce toxic exhaust gases, particularly with scrap metal melting plants, sintering plants, and blast furnaces.

TABLE

| | |
|---|---|
| Volume flow | 100–1100 Nm³/h |
| Temperature | 95° C. |
| Dew Point temperature | 65–70° C. |
| Fly Ash | 0.4 mg/Nm³ |
| Water | 200–250 g/Nm³ |
| Hydrochloric Acid | <1 mg/Nm³ |
| Hydrofluoric Acid | <0.5 mg/Nm³ |
| Sulfur Dioxide | 10–20 mg/Nm³ |
| Nitrogen Oxides | 150–200 mg/Nm³ |
| PCDD | Σ50 ng/Nm³ |
| PCDF | Σ80 ng/Nm³ |
| Mercury | <50 μg/Nm³ |

This gas was irradiated using an electron accelerator whose dose output was varied between 0 and 5 kGy.

Figure 1:
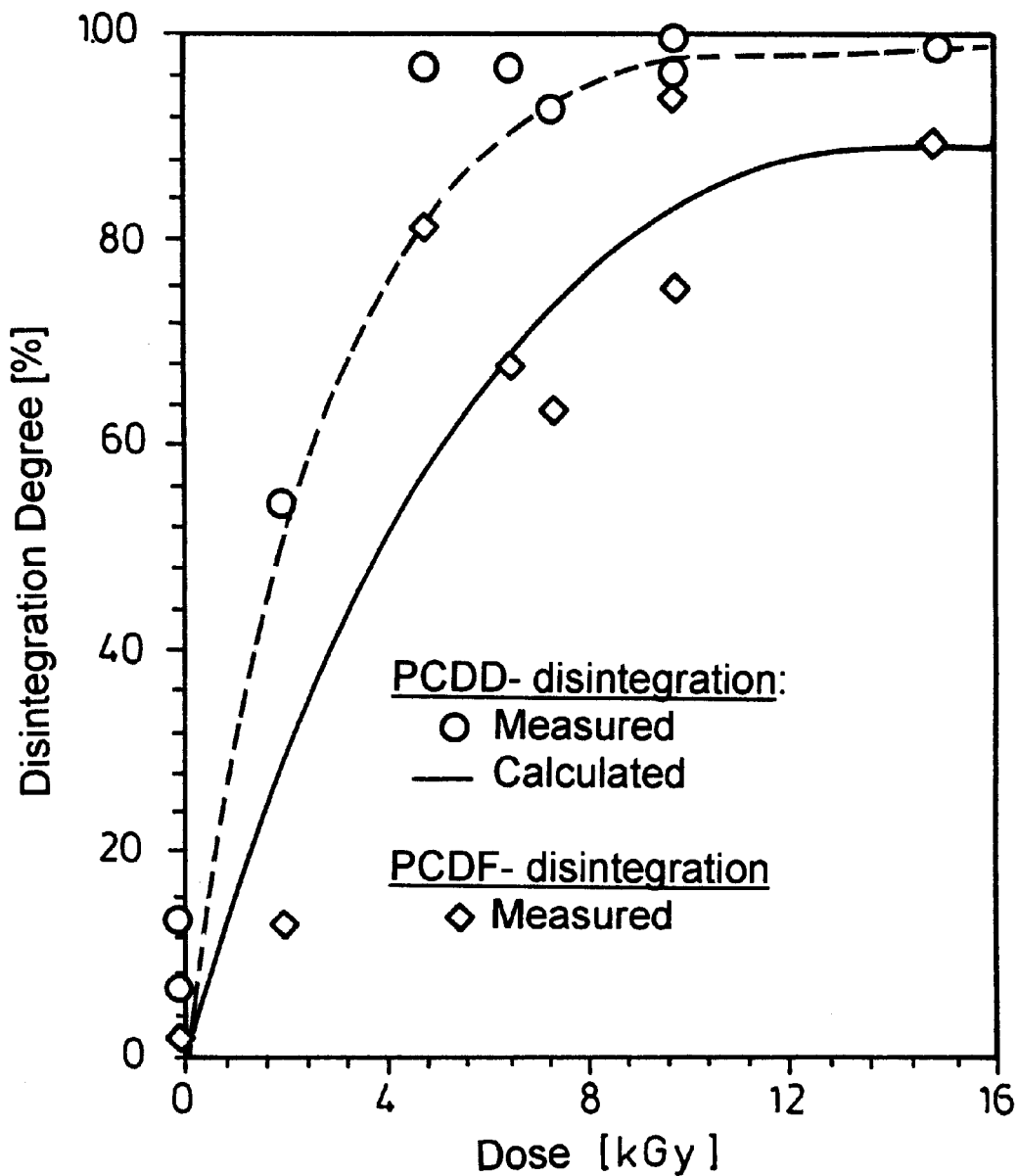
FIG. 1 shows the disintegration of PCDD and PCDF as a function of the irradiation dose (dashed line) in comparison with data values as calculated for PCDD.

As can be seen from FIG. 1, with an irradiation dose of 12 kGy, PCDD and PCDF were disintegrated to 90%. For PCDD, a disintegration degree of 95% was measured already at 5 kGy. It is to be expected that the PCDF are more stable with regard to an attack by OH radicals. In this case, a dose of 10–15 kGy is needed to obtain a 90% disintegration.

It has been found that chlorobenzenes and chlorophenols are also disintegrated to a substantial degree.

For chlorophenols, the disintegration degrees are at 5 kGy 59%, at 10 kGy 85–88% and at 15 kGy 92%. Chlorobenzenes are disintegrated at 10 kGy to 43% and at 15 kGy to 52%.

Figure 2:
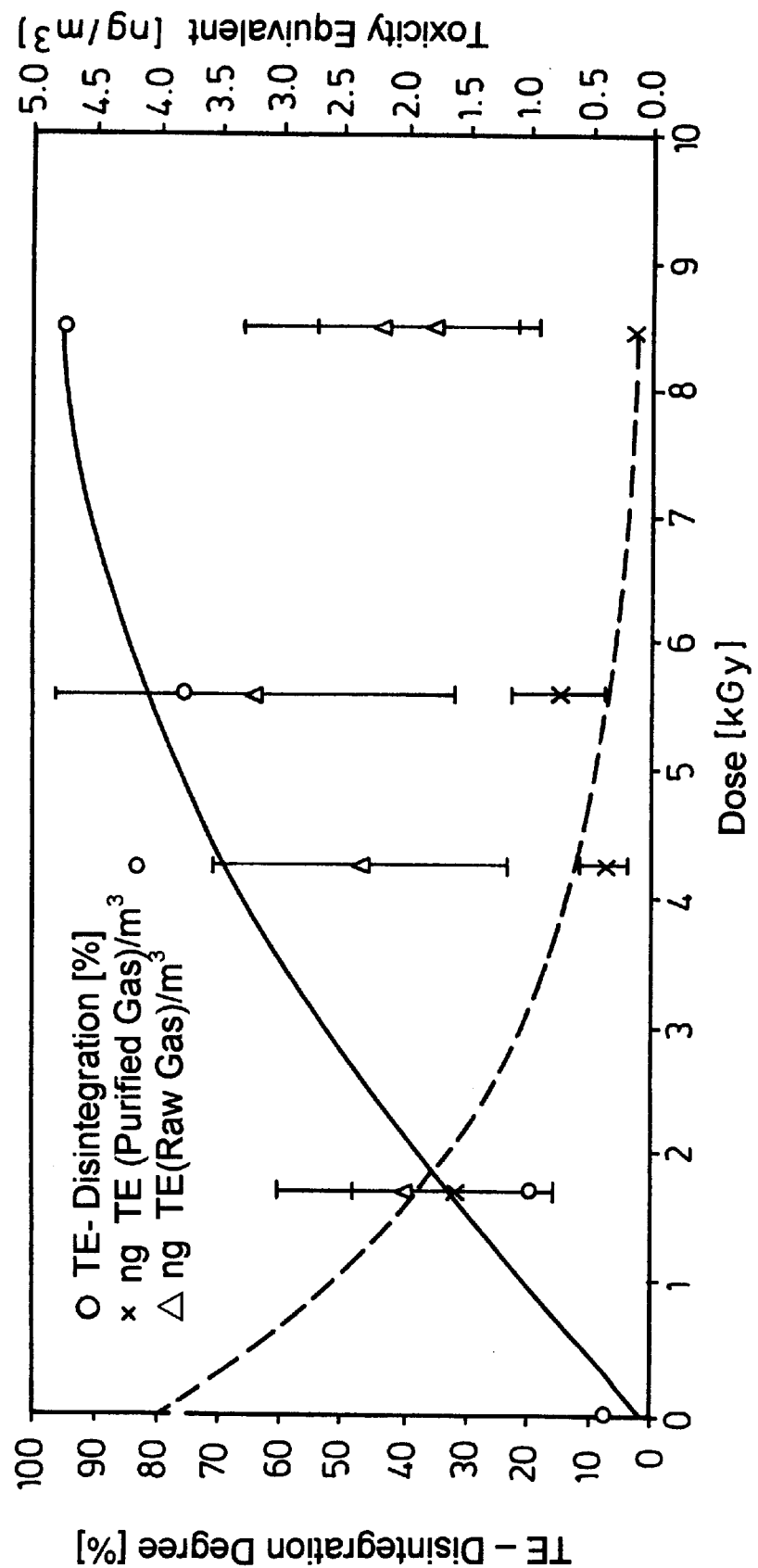
FIG. 2 shows the toxicity equivalent (TE) and TE disintegration degree as a function of the irradiation dose.

FIG. 2 shows the toxicity equivalent-disintegration degree over the irradiation dose. The data are based on test results.

For the evaluation of the absolute disintegrated TE concentrations the following applies:

$$\Delta TE[ng/m^3] = 0.27 \, dose[kGy] + 0.4$$

With the presently typical emission values of 2±0.5 TE/m³ at the test facility, a minimum dose of 7±0.5 TE/m³ kGy is necessary for maintaining the limit value of the 17. BlmSchV.

What is claimed is:

1. A process for destroying chlorinated aromatic compounds in an exhaust gas containing also sulfur dioxide, nitrogen oxides and dust, comprising the steps of:

at a temperature of between room temperature and 150° C., removing from said exhaust gas dust to a residual quantity of not more than 50 mg/m³, removing sulfur dioxide to a residual concentration of not more than 1000 mg/m³, removing nitrogen oxides to a residual concentration of not more than 300 mg/m³, and then subjecting the exhaust gas to electron irradiation having an energy of 3 to 10 kWh/1000 m³ of the exhaust gas to destroy any chlorinated aromatic compounds.

2. A process according to claim 1, wherein the residual dust quantity is not more than 30 mg/m³, the residual sulfur dioxide concentration is not greater than 500 mg/m³ and the residual nitrogen oxide concentration is not greater than 100 mg/m³.

3. A process according to claim 1, wherein said exhaust gas is the exhaust of a waste incineration plant.

4. A process according to claim 1, wherein said exhaust gas is the exhaust gas of a scrap metal melting plant.

5. A process according to claim 1, wherein said exhaust gas is the exhaust gas of a sintering plant or a blast furnace.

6. A process according to claim 1, wherein said dust is removed from said exhaust gas by water.

* * * * *